Oct. 11, 1949.　　　　R. H. A. THIREAU　　　　2,484,660
RETRACTABLE LANDING GEAR AND ANALOGOUS DEVICE
Filed Oct. 19, 1946　　　　　　　　　　　　　　2 Sheets-Sheet 1
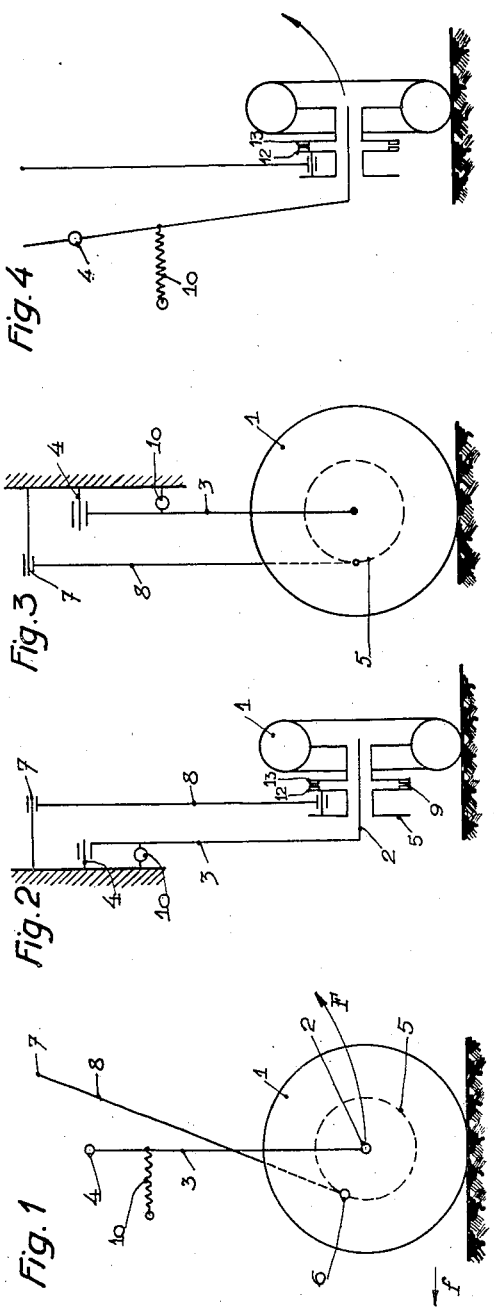
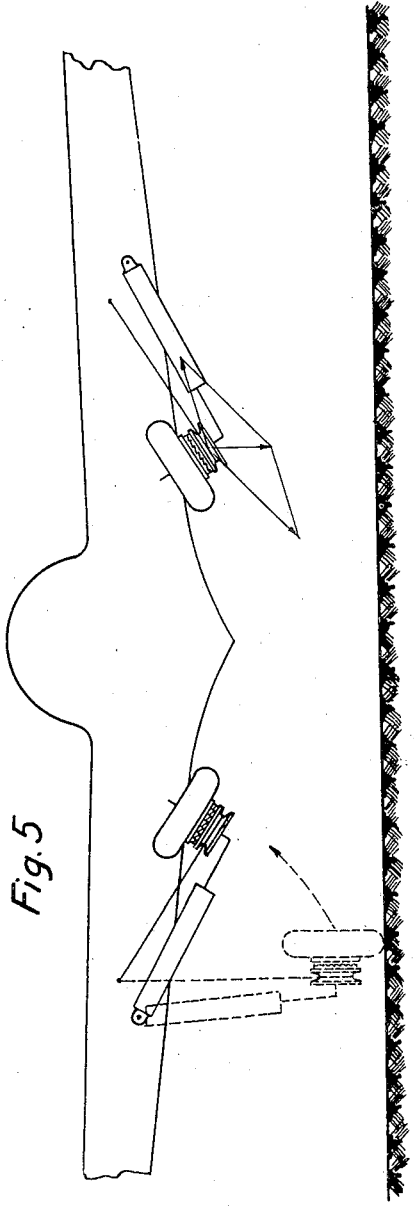
Rémy Henri Albert Thireau
INVENTOR Oct. 11, 1949.  R. H. A. THIREAU  2,484,660
RETRACTABLE LANDING GEAR AND ANALOGOUS DEVICE
Filed Oct. 19, 1946  2 Sheets-Sheet 2
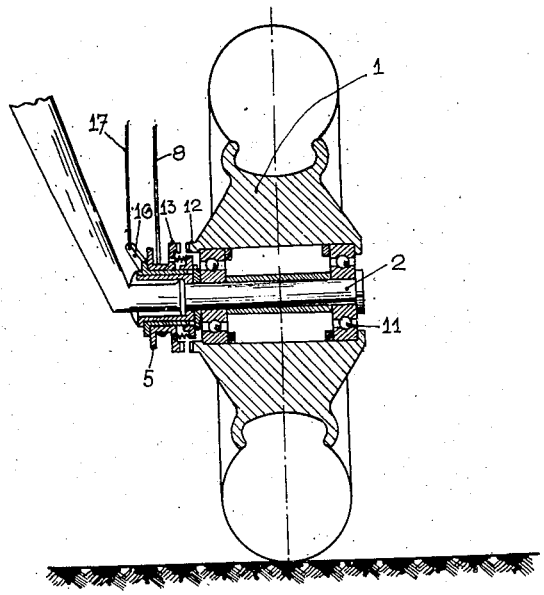
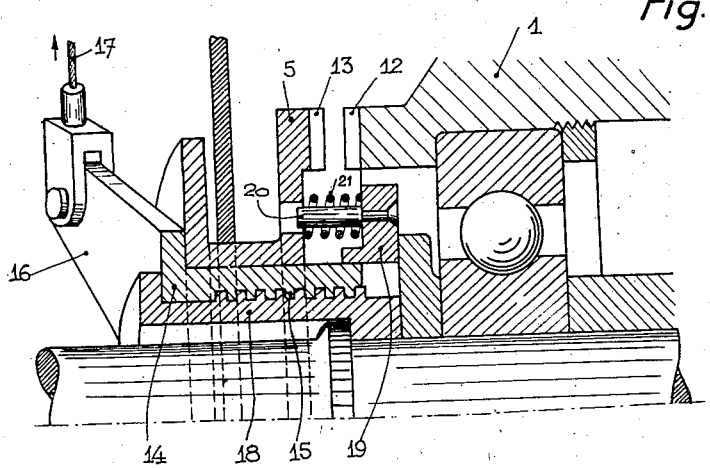
RÉMY HENRI ALBERT THIREAU
INVENTOR Patented Oct. 11, 1949

2,484,660

UNITED STATES PATENT OFFICE 2,484,660

RETRACTABLE LANDING GEAR AND ANALOGOUS DEVICE

Remy Henri Albert Thireau, Garches, France

Application October 19, 1946, Serial No. 704,384
In France August 25, 1943

Section 1, Public Law 690, August 8, 1946
Patent expires August 25, 1963

4 Claims. (Cl. 244—102)

It is known that the landing gears of modern aeroplanes are provided with devices intended to retract them after the take off, in such manner as to reduce the head resistance. All the retracting devices known at the present time necessitate an extraneous energy supplied by any suitable source, for instance electric, hydraulic, pneumatic, etc.

The present invention has for its object to ensure the retracting of the landing gears without having recourse to any extraneous source of energy.

According to the invention, the retracting of a wheel or of a set of wheels is ensured by the action of the kinetic energy stored up by said wheel or wheels as the vehicle is running on the ground and available as soon as said vehicle has taken off.

As a matter of fact, considering for the sake of example the case of an aeroplane, it is clear that as the latter is unable to take off before it has reached a certain speed, the wheels thereof constitute a fly-wheel which can very rapidly store up the kinetic energy necessary for retracting the landing gear. This energy is available as soon as the wheels have left the ground and it suffices, at this time, according to the invention, to transform this kinetic energy of rotation of the wheels about their axes into landing gear retracting work.

It will be possible to carry out the invention in many different ways and, without departing for this reason from the principle of the invention, to devise the most varied constructions, on the condition that use is made, for the retracting of the wheel or wheels, of the kinetic energy stored up by said wheel or wheels during the running of the vehicle on the ground and made available by the taking off of the wheels from the ground.

On the annexed drawings, I have shown, merely for the sake of example, two simple embodiments according to the invention, applied to the retracting of the landing gear of an aeroplane.

On these drawings:

Fig. 1 is a diagrammatical view in elevation of a wheel constituting one half of an aeroplane landing gear.

Fig. 2 is a side view of the same device.

Fig. 3 is a view similar to that of Fig. 1, showing a device in which retracting is performed laterally instead of being performed in the front to rear direction as in the case of Fig. 1.

Fig. 4 is a side view of the device of Fig. 3.

Fig. 5 diagrammatically shows an aeroplane provided with two half devices made according to Figs. 3 and 4.

Fig. 6 is a sectional view showing a detail of construction of a retracting device according to the invention, and Fig. 7 is a view on an enlarged scale of a detail of the device of Fig. 6.

Referring first to Figs. 1 and 2, 1 is a wheel mounted loose on a stub axle 2 mounted on the end of a strut 3 pivoted to the aeroplane about an axis 4. On stub axle 2 is for instance mounted, also loose thereon, a pulley 5 the point 6 of which is connected to a fixed point 7 of the airplane through a cable 8. Between pulley 5 and wheel 1 is provided any suitable clutch system, such as 9. In order to perform the retracting of wheel 1, it suffices, when the aeroplane has left the ground, to couple the pulley and the wheel. The kinetic energy stored up in the wheel during the running on the ground causes wheel 5 to rotate. Cable 8 is thus quickly wound around this pulley and strut 3 undergoes a pivoting movement about axis 4, thus causing the wheel to be retracted in the direction of arrow F, if it is supposed that the aeroplane is running in the direction of arrow f. To ensure the lowering of the landing gear, it is possible to utilize any elastic system capable of storing up, during the retracting of the landing gear, the energy that is necessary and of giving it back for causing the wheels to move down.

In the example of Figs. 1 and 2, this elastic system is diagrammatically shown at 10.

Instead of the retracting device constituted by pulley 5 and cable 8, it is of course possible to employ any other kinematic system adapted to give the same result.

According to the invention, it has been found, as a matter of fact, that the energy of the wheels is quite sufficient, not only for the retracting, but also for placing under tension the elastic device intended to ensure the lowering of the landing gear. As an instance, an example of construction is given which shows that the available energy is in fact amply sufficient. It will be supposed that the weight of the strut with its shock absorber is 26 kgs., the weight of the pneumatic tire 10 kgs. and the weight of the wheel 11 kgs. The calculation of the kinetic energy that is stored up in a wheel while the aeroplane is running on the ground will be made for the following characteristics:

Take off speed of the aeroplane__kms per h__ 130
Wind velocity _____do____ 30
Running speed 130-30_____do____ 100
Weight of the wheel applied to a mean radius of 175 mms_____kgs__ 21

According to the formula of living force:

$$T = \int_{t_0}^{t} d\frac{mV^2}{2}$$

It is found that T is equal to 250 kgm.

The work necessary for the retraction of one half of a landing gear, together with the stretching of an elastic cable for ensuring the downward movement of the landing gear is 78 kgm.

Neglecting the aerodynamic effort on this system, it is seen that retracting is still ensured for a running speed of 55 km. per hour. Besides, if necessary, a speed reducing gear of any suitable type may be interposed between the clutch and the pulley for the winding of the cable.

Figs. 3 and 4 show an embodiment in which the wheel, instead of being retracted in the front to rear direction, as in the case of Fig. 1, is retracted laterally. In this example, as in the preceding one, 1 is the wheel, 3 the strut, 5 the pulley and 8 the cable. Retracting is obtained exactly in the same manner as in the case of Figs. 1 and 2, with the difference that axis 4 and the point of fixation 7 are differently positioned. 10 is the elastic system intended to ensure the lowering of the landing gear.

Fig. 5 diagrammatically shows an aeroplane including two half landing gears according to Figs. 3 and 4. It will be noted that, in the case of strut 3 being an elastic strut, which is the most usual case in known landing gears, the retracting according to the invention automatically determines an effort on said strut in the direction corresponding to compression thereof. As a matter of fact, it suffices to refer to the right hand side of Fig. 5 to see that, under the effect of the traction exerted by the cable on the pulley, the strut has a tendency to contract. This is very favorable to the retracting of the landing gear into the body of the aeroplane, since, by suitably calculating the elements that are in presence, it is possible, with such an arrangement, to reduce the space occupied by the landing gear in the folded state. This avoids the necessity of utilizing for this purpose special devices, as it has often been the case.

The strut is maintained in contracted position by a locking system the release of which is controlled by the pilot, which system may be the same as that which holds the strut in retracting position.

The engagement of the pulley and the wheel may of course be performed in any suitable way without departing from the spirit of the invention. However, in Figs. 6 and 7, one has shown, merely by way of example, an embodiment of such a coupling device.

In these drawings, one sees at 1 the wheel mounted on stub axle through the intermediate of ball bearings 11. Wheel 1 and pulley 5 each carry a toothed annular member, respectively 12 and 13. Pulley 5 is mounted loose on a sleeve 14 provided with inner screwthreads 15. The sleeve carries a lug 16 in which is fixed the cable 17 for the control of the clutch. On the stub axle 2 is also mounted a sleeve with external threads 18. The pulley is kept out of engagement by a friction ring 19 provided with driving projections 20 which come to house into the pulley. On these lugs are placed return springs 21. For coupling the pulley with the wheel, it suffices to pull cable 17. This traction produces the screwing of sleeve 14 on sleeve 18 in the direction of rotation of the wheel and keeps the pulley engaged during the rotation of the wheel.

According to an embodiment of the invention, the retracting device may be completed by a small motor (for instance an electric motor 31) mounted on the strut and which drives a roller in mesh with the wheel. In this way, it is possible, in the case of the velocity of the wheel appearing to be insufficient, to increase its velocity so as to ensure the retracting. This motor may further serve to rotate the wheels immediately prior to landing for ensuring contact with the ground under improved conditions.

It should be well understood that the invention is in no way limited to the examples described and shown and that it covers, in the most general manner, any wheel retracting device for vehicles, whatever be the type of the strut and whatever be the vehicle. The invention is therefore applicable not only to aircraft, but also to amphibious vehicles intended both to run on the ground and to float on water. However, the invention is more particularly concerned with bicycle, tricycle or quadricycle landing gears, tail skids, etc.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the accompanying claims.

What I claim is:

1. A wheel retracting device for an aircraft which comprises, in combination, a retractable support for the wheel, a pulley carried by said support so as to be freely rotatable thereon, a flexible cable fixed at one end to the periphery of said pulley and at the other end to a point of said aircraft so that winding of said cable on said pulley causes said support to be brought into retracted position, and means for coupling said pulley with said wheel so that the kinetic energy accumulated in said wheel during the running thereof on the ground can be transmitted to said pulley for winding said cable thereon and retracting said support and said wheel.

2. An aircraft retractable landing gear which comprises, in combination, a strut pivoted to said aircraft, a wheel axle carried by said strut, a pulley carried by said axle so as to be freely rotatable with respect to said wheel, a flexible cable fixed at one end to the periphery of said pulley and at the other end to a point of said aircraft so that winding of said cable on said pulley causes said strut to pivot to bring said wheel into retracted position, and means for coupling said pulley with said wheel so that the kinetic energy accumulated in said wheel during the running thereof on the ground can be transmitted to said pulley for winding said cable thereon and retracting said wheel.

3. A wheel retracting device for an aircraft which comprises, in combination, a retractable support for the wheel, a pulley carried by said support so as to be freely rotatable thereon, a flexible cable fixed at one end to the periphery of said pulley and at the other end to a point of said aircraft so that winding of said cable on said pulley causes said support to be brought into retracted position, means for coupling said pulley with said wheel so that the kinetic energy accumulated in said wheel during the running thereof on the ground can be transmitted to said pulley for winding said cable thereon and retracting said support and said wheel, locking means for keeping the wheel support in the retracted position, and elastic means interposed between said aircraft and said support and adapted to be stressed during the retracting of the wheel, for bringing back said support into expanded position upon release of said locking means.

4. An aircraft retractable landing gear which comprises, in combination, a strut pivoted to said aircraft, a wheel axle carried by said strut, a pulley carried by said axle so as to be freely rotatable with respect to said wheel, a flexible cable fixed at one end to the periphery of said pulley and at the other end to a point of said aircraft so that winding of said cable on said pulley causes said strut to pivot to bring said wheel into retracted position, means for coupling said pulley with said wheel so that the kinetic energy accumulated in said wheel during the running thereof on the ground can be transmitted to said pulley for winding said cable thereon and retracting said wheel, locking means for keeping the wheel support in the retracted position, and elastic means interposed between said aircraft and said strut and adapted to be stressed during the retracting of the wheel, for bringing back said wheel into expanded position upon release of said locking means.

REMY HENRI ALBERT THIREAU.

REFERENCES CITED

The following references are of record in the file of this patent:

UNITED STATES PATENTS

| Number | Name | Date |
| --- | --- | --- |
| 2,138,030 | Giovannoli | Nov. 29, 1938 |
| 2,224,481 | Laraque | Dec. 10, 1940 |
| 2,347,986 | Bowerman | May 2, 1944 |
| 2,381,842 | Schwend | Aug. 7, 1945 |
| 2,417,937 | Knox | Mar. 25, 1947 |

FOREIGN PATENTS

| Number | Country | Date |
| --- | --- | --- |
| 442,419 | France | June 20, 1912 |
| 706,033 | Germany | May 16, 1941 |